US012705256B2

(12) United States Patent
Jain et al.

(10) Patent No.: US 12,705,256 B2
(45) Date of Patent: Aug. 11, 2026

(54) CONTEXT BASED SUSTAINABLE LOGGING

(71) Applicant: International Business Machines Corporation, Armonk, NY (US)

(72) Inventors: Abhishek Jain, Baraut (IN); Sarika Sinha, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 95 days.

(21) Appl. No.: 18/744,894

(22) Filed: Jun. 17, 2024

(65) Prior Publication Data

US 2025/0384060 A1 Dec. 18, 2025

(51) Int. Cl.
*G06F 16/28* (2019.01)

(52) U.S. Cl.
CPC .................................. *G06F 16/285* (2019.01)

(58) Field of Classification Search
CPC .................................................... G06F 16/285
USPC ........................................................ 707/737
See application file for complete search history.

(56) References Cited

U.S. PATENT DOCUMENTS 9,619,478 B1 * 4/2017 Singh .................. G06F 11/3476
10,956,672 B1 * 3/2021 Ben-Natan ............ G06F 16/285
11,113,317 B2 * 9/2021 Vizer ................ G06F 16/24564
11,119,985 B1 * 9/2021 Alagianambi .......... G06F 40/42
2013/0138667 A1 * 5/2013 DeStefano .......... G06F 11/3082
707/755
2016/0292263 A1 * 10/2016 Ferrar ................ G06F 11/0775
2016/0292592 A1 * 10/2016 Patthak ............... G06F 3/04842
2018/0089304 A1 * 3/2018 Vizer .................. G06F 16/287
2018/0285432 A1 * 10/2018 Das ..................... G06F 16/955
2019/0073406 A1 * 3/2019 Xu ....................... B01D 29/111
2020/0394564 A1 12/2020 Singh et al.
2022/0019588 A1 * 1/2022 Jha ...................... G06F 16/1734
2022/0092062 A1 * 3/2022 Ferrar .................. G06F 40/205
2022/0147507 A1 * 5/2022 Bogdanowicz ..... G06F 11/3466
2022/0207163 A1 * 6/2022 Gentleman ............ G06F 21/62
2022/0207429 A1 * 6/2022 Haribhakti ............ G06N 20/10
2022/0222252 A1 * 7/2022 Jha ...................... G06F 11/1471
2023/0231786 A1 7/2023 Kairali et al.
(Continued)

OTHER PUBLICATIONS

Anonymous, “Data Logging”, dSpace Website, dSPACE GmbH, <https://www.dspace.com/en/pub/home/applicationfields/foo/data_logging.cfm>. Apr. 2024, 8 pages.
(Continued)

*Primary Examiner* — Joshua Bullock
(74) *Attorney, Agent, or Firm* — CHIP LAW GROUP

(57) ABSTRACT

Mechanisms are provided for optimizing application log messages. A first log message is received and parsed to extract features. One or more second log messages are parsed to extract context information for determining a context of the first log message. The first log message is classified as to whether the first log message is a candidate for optimization based on the extracted features and context of the first log message. In response to the first log message being classified as a candidate for optimization, a template is generated for the first log message, wherein the template stores parameters of the first log message for later regeneration of the first log message. The first log message is replaced with a reference to the template to generate a reduced size log entry, and the reduced size log entry is stored in the log file.

18 Claims, 6 Drawing Sheets

(56) References Cited

U.S. PATENT DOCUMENTS

| | | | | |
|---|---|---|---|---|
| 2024/0020405 | A1* | 1/2024 | Jha | G06F 21/6218 |
| 2025/0045259 | A1* | 2/2025 | Srinivasan | G06F 16/219 |
| 2025/0286728 | A1* | 9/2025 | Brodsky | H04L 9/0825 |

OTHER PUBLICATIONS

Anonymous, "logreduce 0.6.1", 2024 Python Software Foundation Search Projects, Jan. 19, 2021, 9 pages.

Bendapudi, Prathyusha, "Log Frequency Analysis for anomaly detection in Cloud Environments", Blekinge Institute of Technology, Sweden, Thesis paper submitted to Faculty of Software Engineering, for Master of Science in Software Engineering, Jan. 2024, 74 pages.

Brown, Andrew, "Reduce log size and cut costs with NXLog", NXLog Website, https://nxlog.co/news-and-blog/posts/reduce-data-size-and-cost, Jun. 11, 2021, 12 pages.

Locke, Steven et al., "LogAssist: Assisting Log Analysis Through Log Summarization", IEEE Transactions on Software Engineering, vol. 48, Issue: 9, May 26, 2021, 15 pages.

* cited by examiner

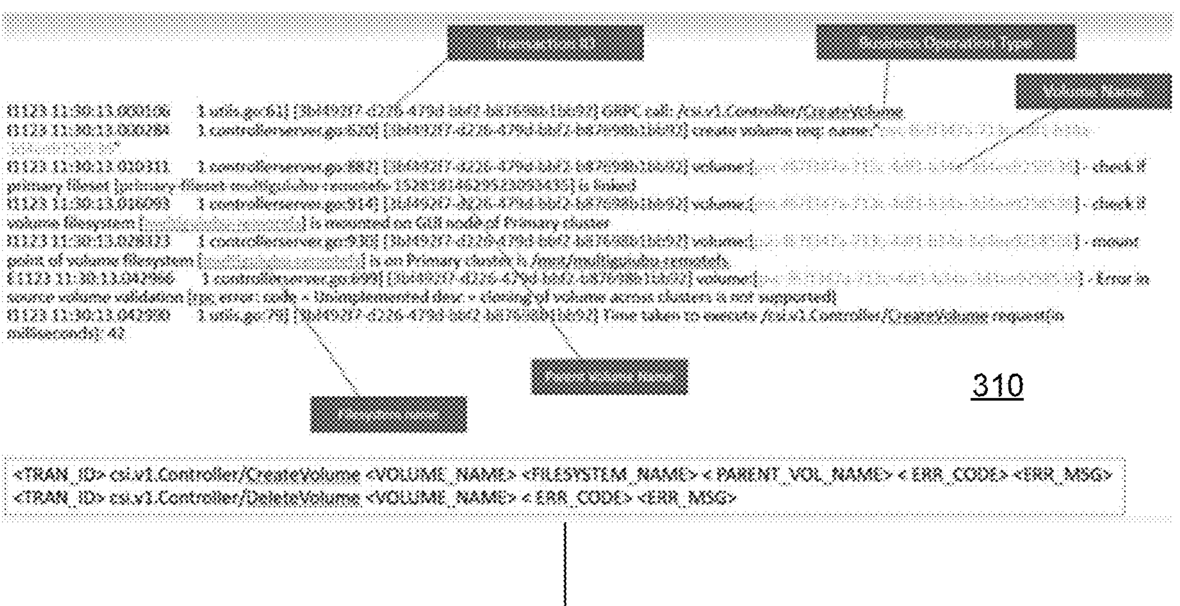

volume_context:<key:"csi.storage.k8s.io/ephemeral" value:"false" > volume_context:<key:"csi.storage.k8s.io/pod.name" value:"csi-scale-fsetdemo-pod1" > volume_context:<key:"csi.storage.k8s.io/pod.namespace" value:"ibm-spectrum-scale-csi" > volume_context:<key:"csi.storage.k8s.io/pod.uid" value:"7f9161a3-43f7-4592-983a-2207b84a27ae" > volume_context:<key:"csi.storage.k8s.io/pv/name" value:"pvc-6ef6ff36-f80f-42f8-b567-8cf701dcfcca" > volume_context:<key:"csi.storage.k8s.io/pvc/name" value:"scale-fset-pvc1" > volume_context:<key:"csi.storage.k8s.io/pvc/namespace" value:"ibm-spectrum-scale-csi" > volume_context:<key:"csi.storage.k8s.io/serviceAccount.name" value:"default" > volume_context:<key:"storage.kubernetes.io/csiProvisionerIdentity" value:"1673517467353-8081-spectrumscale.csi.ibm.com" > volume_context:<key:"volBackendFs" value:"remote-multiguitest-fs1" > completed successfully, time spent : 130ns

CONTEXT BASED SUSTAINABLE LOGGING

BACKGROUND

The present application relates generally to an improved data processing apparatus and method and more specifically to an improved computing tool and improved computing tool operations/functionality for context based sustainable logging.

Logging is the process of collecting and recording information about an application's activity, such as errors, warnings, and other events. Put another way, logging involves recording application actions and state during execution of the application. Logging is an essential part of software development, as it assists software developers in understand what is happening inside the application so that they can identify, diagnose, and address issues in the application execution when they arise. However, logging can quickly consume significant amounts of storage space, particularly in applications with high traffic or long-running processes.

To save storage space, various optimization techniques have been developed. For example, one optimization may be to limit log levels. Log levels are indicators of importance of a particular log message, i.e., log data generated by a source computing system, and serves as an indicator within a log management system to indicate the importance or urgency of entries within the log data. Limiting log levels involves using log levels to avoid logging unnecessary information. For example, setting the log level to "debug" in production may result in large log files, while a log level of "error" or "warn" will only log essential information.

Another optimization is referred to as rotate logs and involves setting up a log rotation to automatically archive old log files and prevent them from taking up too much storage space. Rotating logs can also help with performance issues as it reduces the size of log files that need to be searched.

In other optimizations, the logs may be compressed by compression algorithms to reduce storage space requirements by significantly reducing the size of the log file. In other optimizations, a structured log may be used in which a structured logging format allows logs to be saved in a more compact and efficient way and makes searching and analyzing log data easier due to the known structure, which can assist developers in identifying issues more quickly. In some optimizations log aggregation tools may be used to centralize logs from multiple sources, log retention may be limited by using policies to determine how long log files need to be kept for compliance or auditing purposes and automatically delete logs that are no longer needed.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for optimizing application log messages. The method comprises receiving a first log message for inclusion in a log file and parsing the first log message to extract features of the first log message. The method also comprises parsing one or more other second log messages, associated with the first log message, to extract context information for determining a context of the first log message. Furthermore, the method comprises classifying the first log message as to whether the first log message is a candidate for optimization based on the extracted features of the first log message and the context of the first log message. In addition, the method comprises generating, in response to the first log message being classified as a candidate for optimization, a template for the first log message, wherein the template stores parameters of the first log message for later regeneration of the first log message. The method further comprises replacing the first log message with a reference to the template to generate a reduced size log entry, and storing the reduced size log entry in the log file.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 3 is an example diagram of a log entry for an application operation in accordance with one illustrative embodiment;

FIG. 4 is an example diagram of a template for storing parameter values for log messages that have been optimized/reduced in accordance with one illustrative embodiment;

DETAILED DESCRIPTION

Figure 1:
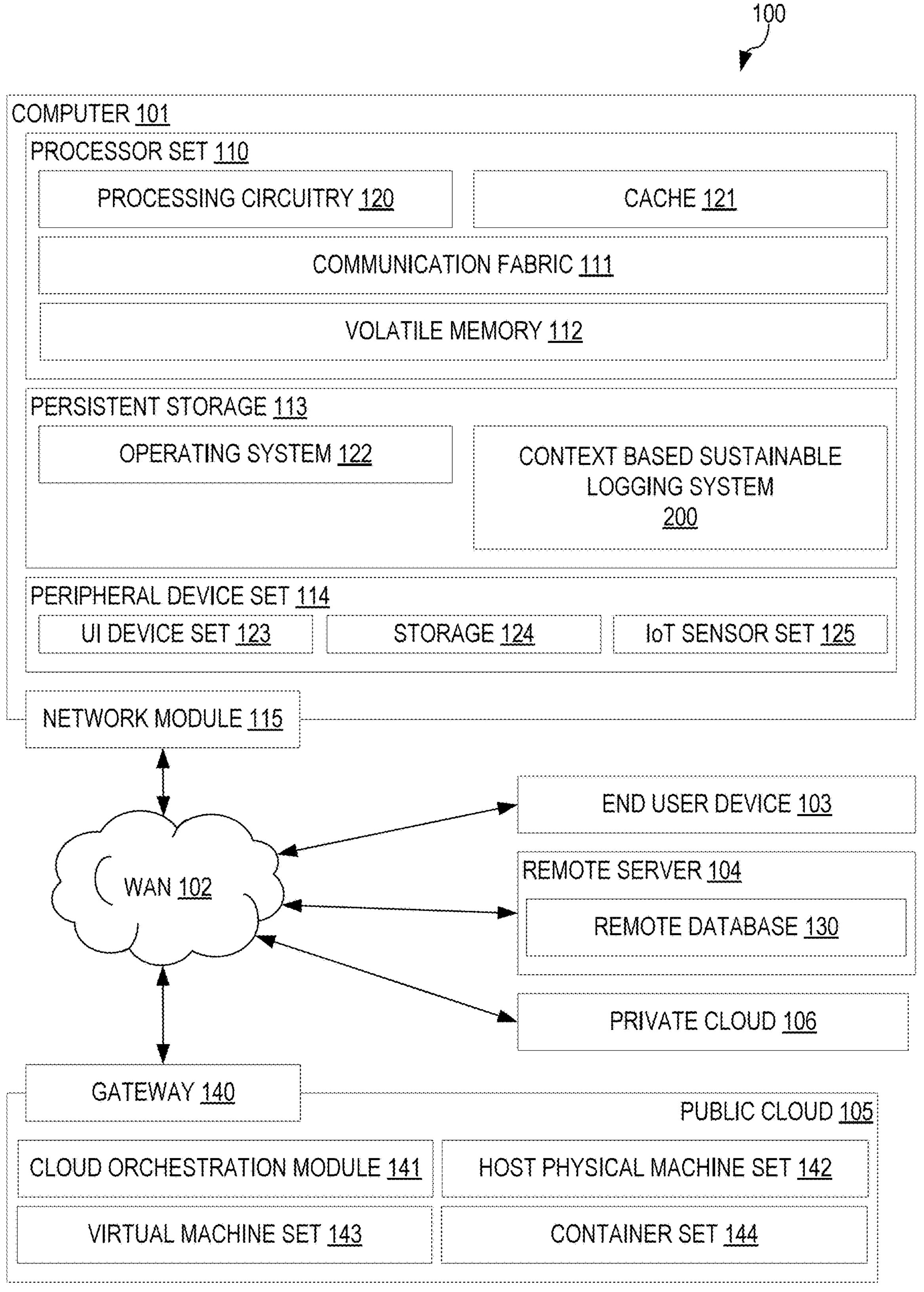
FIG. 1 is an example diagram of a distributed data processing system environment in which aspects of the illustrative embodiments may be implemented and at least some of the computer code involved in performing the inventive methods may be executed.

The illustrative embodiments provide an improved computing tool and improved computing tool operations/functionality for context based sustainable logging. The illustrative embodiments provide improved computing tool operations/functionality that are able to automatically distinguish between critical and non-critical portions of log messages so that reduction of log entries may be targeted on non-critical portions of the log messages. Moreover, the illustrative embodiments provide improved computing tool operations/functionality to reduce the non-critical portions of log messages in a manner such that these non-critical portions may be regenerated at a later time should the need arise.

Existing techniques for optimizing log files can help in reducing the amount of storage space needed to store these log files, however these techniques lead to a problem that may be referred to as the Fear of Missing Out (FOMO). That is, by reducing what is logged, or what logs are maintained, developers may fear that important information may not be logged or maintained in the log files, or cannot be easily accessible for purposes of searching, debugging, or other development activities. That is, developers have the fear that log lines and log data may be unavailable when needed. Thus, there is a reluctance to remove log information that may not be critical due to a fear of loss of log information. This may lead to logging the non-critical information, leading to larger log files and hence, greater transmission bandwidth usage and higher storage requirements and costs. Moreover, in some cases, even when implementing the optimization techniques, the log files may still be large in size resulting in similar issues.

Thus, an undesirable situation exists in that logs become expensive if left unchecked, i.e., without optimizations to reduce storage space requirements, but optimizations may result in FOMO and possible loss of important information for software development if applied indiscriminately. This problem in existing application development logging tools and optimizations becomes even more an issue when one considers modern workloads, such as container applications or serverless functions, where provisioning and deprovisioning resources is performed frequently and each of these infrastructure operations are logged for auditing purposes or for later analysis in case of a failure. Each operation, i.e., provisioning and deprovisioning resources, involves large amounts of logging which requires a large costs with regard to public or private cloud service providers due to the required storage space for the log files.

For example, a PersistentVolume operation in a running Kubernetes cluster of a large environment may have 220,000 or more operations per day that are only directed to deleting the Persistent Volume from the storage infrastructure. Storing the log files for these operations on a remote server for auditing, as well as transmitting these log files to the remote server, or sending the log files to a vendor for analysis, is a network intensive and costly endeavor. However, such operations seldom have important information in their logs needed for software development. This is just for one such type of operation, i.e., deleting the Persistent Volume, and there are many other operations that are logged which only adds to the size of log files that need to be stored, maintained and transmitted and which may have little use in software development.

By contrast, there may be in a single day, a relatively smaller number of relatively more important operations, e.g., health check related operations. For example, as opposed to the 220,000 or more deletion operations noted above, there may be only approximately 150 health check related operations. While these are also repeated transactions, software developers are more interested in seeing the logs of such operations or transactions in more detail in order to check the overall state of the application during the day. Thus, such important health check related operations/transactions should not have their log entries reduced through such storage size reduction optimizations.

As another example, some operations may not be generally important to log, however specific conditions of a particular instance of the operations may be important to log. For example, the delete operations described above may be expected to be completed within a predetermined period of time, e.g., 40 seconds. However, if one of the 220,000 delete operations noted above is determined to have taken 200 seconds to complete, then a developer may want to look at the operations/transactions before and after that delete operation in order to determine why the delete operation took so long to complete. Thus, it is important to not reduce these log entries from the log file so as to preserve the ability for software developers to investigate potentially problematic execution of the application.

The above examples illustrate that the context of the log entries is important to consider when determining how to optimize the log files for reducing storage space requirements, but avoiding the issues of FOMO and potentially eliminating important log entries just to reduce the size of the log file. However, existing logging systems and methods do not take into consideration such contexts when optimizing logs for reduced storage requirements.

The illustrative embodiments provide an improved computing tool and improved computing tool operations/functionality that provides a context based sustainable logging framework which reduces the size of the log files that are stored and transmitted without compromising application development operations, and without compromising support services, applications, and security and compliance requirements. The improved computing tool and improved computing tool operations/functionality are specifically directed to solving problems in existing log file optimizations, which is a problem arising from computer technology, by providing a specific improved computing tool that optimizes log files based on evaluation of the context of the log entries to determine which log entries may be reduced without compromising important log information for application development and compliance. The illustrative embodiments provide an improved computing tool and improved computing tool operations/functionality to optimize large log file transfers over data networks for application development, such as debugging or storing at remote servers for later retrieval, auditing, or the like. This in turn saves costs to software developers, such as in the case of cloud based services and infrastructure costs, and reduces the carbon footprint for large organizations in the long run.

In some illustrative embodiments, the context based sustainable logging system comprises a log optimizer and a dynamic log regenerator. The log optimizer operates to analyze each log entry to identify the portion of the log entry, or log message, which is non-critical or which can be rebuilt based on requests for debugging and understanding of the important operations of an application. The dynamic log regenerator operates to regenerate log entries, when requested, based on the source of the log entries, i.e., application messages, and source code repositories for such applications. Thus, the log optimizer operates to evaluate the context of log entries to determine which portions of log entries, or which log entries as a whole, can be reduced, i.e. are non-critical. Moreover, the issues of FOMO or potential loss of important log information may be overcome by the implementation of the dynamic log regenerator which is able to regenerate the reduced portions of the log information if it is dynamically determined to be needed, such as in response to a request to access such log information. This reduces log storage size and data transfer size requirements while avoiding loss of log information.

The following description provides examples of embodiments of the present disclosure, and variations and substitutions may be made in other embodiments. Several examples will now be provided to further clarify various aspects of the present disclosure.

Example 1: A method, in a data processing system, for optimizing application log messages. The method comprises receiving a first log message for inclusion in a log file and parsing the first log message to extract features of the first log message. The method further comprises parsing one or more other second log messages, associated with the first log message, to extract context information for determining a context of the first log message. The method also comprises classifying the first log message as to whether the first log message is a candidate for optimization based on the extracted features of the first log message and the context of the first log message. In addition, the method comprises, in response to the first log message being classified as a candidate for optimization, generating a template for the first log message, where the template stores parameters of the first log message for later regeneration of the first log message. Furthermore, the method comprises replacing the first log message with a reference to the template to generate a reduced size log entry, and storing the reduced size log entry in the log file.

The above limitations advantageously enable the reduction of the size of log files by optimizing log messages that are determined to be candidates for optimization. The optimized log files are replaced with relatively smaller size references to templates which may be used at a later time for restoring the original log messages should the original log messages be determined to be needed for other operations. Thus, the storage and transmission of log files is optimized by the reduced size of the log files. Moreover, the log files are intelligently optimized by differentiating which log messages are candidates for optimization based on the log messages themselves and their contexts.

Example 2: The limitations of any of Examples 1 and 3-10, where the first log message is a log message for provisioning or deprovisioning computing resources. The above limitation advantageously enables the optimization of log messages that are associated with transactions that of provisioning or deprovisioning of computing resources, which as noted herein, are transactions that occur frequently but have little value in software development and thus, are unnecessary or non-critical for logging purposes and can be optimized by reducing their log messages to corresponding references to a template.

Example 3: The limitations of any of Examples 1-2 and 4-10, where classifying the first log message comprises executing one or more computer executable rules that: (1) analyze the first log message and the one or more other second log messages to determine the frequency of similar transactions corresponding to the first log message in the one or more other second log messages, and a completion status of the similar transactions, to determine if the first log message is associated with a type of transaction that is completing successfully with at least a predetermined frequency within a pre-defined timeframe; (2) classify the first log message as a candidate for optimization in response to a determination that the first log message corresponds to the type of transaction that is completing successfully with at least the predetermined frequency; and (3) in response to a determination that the first log message does not correspond to a type of transaction that is completing successfully with at least the predetermined frequency, classifying the first log message as not a candidate for optimization. The above limitations advantageously enable the selective identification of log messages that correspond to frequently occurring and successfully completed transactions, which are determined to not be of significant value in software development operations, as such software development operations are more concerned with infrequently occurring transactions and ones that do not complete successfully. Thus, by identifying these frequently occurring and successfully completed transactions, their corresponding log messages may be optimized by reducing them to references to corresponding templates.

Example 4: The limitations of any of Examples 1-3 and 5-10, where classifying the first log message comprises executing one or more computer executable rules that: (1) determine whether a transaction corresponding to the first log message has parameter values that are within predetermined limits; and (2) in response to the transaction having parameter values that are within predetermined limits, classifying the first log message as a candidate for optimization. The above limitations advantageously enable the identification of log messages associated with transactions whose parameters are within acceptable limits and thus, are not determined to be outliers or transactions of interest to software development operations. As a result, these types of log messages may be optimized by reduction to references to corresponding templates in accordance with the illustrative embodiments.

Example 5: The limitations of any of Examples 1-4 and 6-10, where classifying the first log message comprises executing one or more computer executable rules that: (1) determine whether a transaction corresponding to the first log message is part of a temporal pattern of transactions having a predetermined temporal distance between transactions in the temporal pattern of transactions; and (2) in response to the transaction corresponding to the first log message being part of the temporal pattern of transactions, classifying the first log message as not a candidate for optimization. The above limitations advantageously enable the identification of log messages that are associated with patterns of transactions occurring within a temporal range of each other, indicating that they may be of more interest to software development operations. As a result, these log messages may be classified as not being a candidate for optimization and thus, maintained in the log file for later operations. In this way, the log messages may be differentiated from other log messages that may be of less interest to software development operations and which can be optimized by reduction to references to corresponding templates.

Example 6: The limitations of any of Examples 1-5 and 7-10, where classifying the first log message comprises classifying the first log message based on a machine learning computer model learning, through a machine learning process, patterns of features of log messages and correlations with criticality classifications, wherein log messages having a critical classification are not candidates for optimization and log messages having a non-critical classification are candidates for optimization. The above limitations advantageously enable artificial intelligence based machine learning computer models to be trained to differentiate between log messages that are to be optimized and those that should not be optimized, such that various patterns of a large number of features of log messages and their contexts may be evaluated to determine the classifications of the log messages in an automated manner.

Example 7: The limitations of any of Examples 1-6 and 8-10, where parsing the one or more other second log messages, associated with the first log message, to extract context information for determining a context of the first log message further comprises executing a similarity comparison of the first log message to other log messages to determine the one or more second log messages which are log messages having at least a predetermined threshold level of similarity to the first log message. The above limitations advantageously enable the identification of similar log messages such that similar log messages may be similarly optimized to corresponding templates and thereby achieve a greater reduction in log file size.

Example 8: The limitations of any of Examples 1-7 and 9-10, where classifying the first log message further comprises at least one of determining whether the first log message is of a particular type of log message that is predefined as a log message that should not be optimized, or determining whether the first log message corresponds to a transaction that required longer than a predetermined amount of time to complete successfully. The above limitations advantageously enable the specification of types of log messages that should not be optimized such that these types of log messages are not reduced and instead are maintained in the log files, even if other criteria would indicate that the log messages are candidates for optimization. Moreover, these limitations also provide for the identification of outlier log messages where the log message may be determined to be one that should be optimized, however if the transaction took longer than expected, it would not be optimized as it is a transaction that is out of the ordinary or not completed as expected and thus, would be of interest to software development operations.

Example 9: The limitations of any of Examples 1-8 and 10, where the method further comprises receiving a request from another computing system to access the log file to perform a computing operation and, in response to receiving the request, regenerating the first log message from the reference to the template in the log file to thereby provide an expanded log file. The method also comprises providing the expanded log file to the other computing system. The above limitations advantageously enable the regeneration of the original log messages from the log file that has those log messages optimized by reduction to a reference to a template. In this way, other computer operations that require the full log message may be able to operate on the reduced size log file once the original log messages are regenerated. Thus, a reduced size log file may be transmitted and stored without losing log message information that may be needed at a later time for other computer operations.

Example 10: The limitations of any of Examples 1-9, where the template stores context information as a parameter descriptor file and descriptor value file. The above limitations advantageously enable reuse of the parameter descriptor file for various descriptor values.

Example 11: A system comprising one or more processors and one or more computer-readable storage media collectively storing program instructions which, when executed by the one or more processors, are configured to cause the one or more processors to perform a method according to any one of Examples 1-10. The above limitations advantageously enable a system comprising one or more processors to perform and realize the advantages described with respect to Examples 1-10.

Example 12: A computer program product comprising one or more computer readable storage media, and program instructions collectively stored on the one or more computer readable storage media, the program instructions comprising instructions configured to cause one or more processors to perform a method according to any one of Examples 1-10. The above limitations advantageously enable a computer program product having program instructions configured to cause one or more processors to perform and realize the advantages described with respect to Examples 1-10.

In accordance with one or more of the illustrative embodiments, a context based sustainable logging system is provided which analyzes application log messages associated with application operations/transactions to determine the frequency of similar application operations/transactions and their completion status to determine if the same type of application operation/transaction is completing successfully in large numbers within a pre-defined timeframe. In such a case, the context based sustainable logging system may implement a fuzzy matching of parameters of the application operations/transactions to determine the context of these application operations/transactions and use the context as inputs for generating a corresponding template of the log message parameters that can be used to regenerate the log entry should regeneration become necessary. These parameter templates may be generated for each different type of application operation/transaction.

Based on these parameter templates, the log files, or log clusters (e.g., in a container based application environment, such as Kubernetes), may be optimized to reduce non-critical log entries or portions of log entries while not reducing critical log entries or portions of log entries. For example, in some illustrative embodiments, if the application operation/transaction (hereafter referred to as a "transaction") parameter values are within predetermined limits, then the application transaction is likely operating correctly and will not be needed for debugging or other application development operations. Thus, the log entry for this application transaction can be reduced by the log optimizer. As another example, if the application transaction only occurs a relatively few number of times, as measured by one or more predetermined thresholds of application transaction instances, and with a relatively large temporal distance between these application transactions, again measured by one or more predetermined thresholds, then such application transaction log entries may not be reduced by the log optimizer as they likely store information that may be needed to evaluate the operation of the application for application development purposes.

In some illustrative embodiments, multiple related application transactions can be identified through a fuzzy matching of similar parameters to identify sequences of related application transactions. In this way, these batches of multiple related application transactions can be processed by the log optimizer to reduce the logs of these multiple related application transactions using a transaction parameter template for the multiple related application transactions. In such a case, if a sequence of application transaction parameters for multiple related application transactions does not match a previously generated application parameter template, further application transactions may be evaluated before updating the application parameter template for subsequent application parameter template matching.

In generating the application parameter templates, the mechanisms of the illustrative embodiments optimize the application parameter templates to match the templates to the corresponding application code stored in one or more code repositories. Based on the logging strings in the repository code, the mechanisms of the illustrative embodiments reduce the logs such that the generated application parameter template can be used by the log regenerator to regenerate the logs that were reduced. That is, the context based sustainable logging system maintains the application parameter templates used for log optimization along with the actual application logs so that the log regenerator is able to regenerate the logs that were reduced.

It has been observed that the operation of the context based sustainable logging system can reach approximately a 70-80% reduction in the log data transmission and storage requirements. Thus, the mechanisms of the illustrative embodiments can enable a significant saving of storage space and data transmission requirements in the scenarios where particular log data is not used frequently or is used in an on-demand manner, in which case the mechanisms of the illustrative embodiments may automatically and dynamically perform regeneration of the log data on request. This results in a more efficient and cost effective logging of transaction data for application development, debugging, compliance auditing, or the like.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides context based logging of application transaction log messages or data. The improved computing tool implements mechanism and functionality, such as the context based sustainable logging system, which cannot be practically performed by human beings either outside of, or with the assistance of, a technical environment, such as a mental process or the like. The improved computing tool provides a practical application of the methodology at least in that the improved computing tool is able to optimize log data to reduce storage and transmission requirements, while maintaining application parameter templates that may be used to regenerate reduced log entries or reduced portions of log entries in a dynamic and automated manner should these log entries/portions of log entries be requested.

FIG. 1 is an example diagram of a distributed data processing system environment in which aspects of the illustrative embodiments may be implemented and at least some of the computer code involved in performing the inventive methods may be executed. That is, computing environment 100 contains an example of an environment for the execution of at least some of the computer code involved in performing the inventive methods, such as context based sustainable logging system 200. In addition to context based sustainable logging system 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and context based sustainable logging system 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in context based sustainable logging system 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in context based sustainable logging system 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As shown in FIG. 1, one or more of the computing devices, e.g., computer 101 or remote server 104, may be specifically configured to implement a context based sustainable logging system 200. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computer 101 or remote server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates optimization of log file sizes to reduce storage and transmission requirements, while maintaining application parameter templates for transactions along with the non-reduced log entries so that reduced log entries, or portions of log entries, may be regenerated dynamically and automatically when needed to perform application development operations, debugging of applications, compliance auditing operations, or the like.

Figure 2:
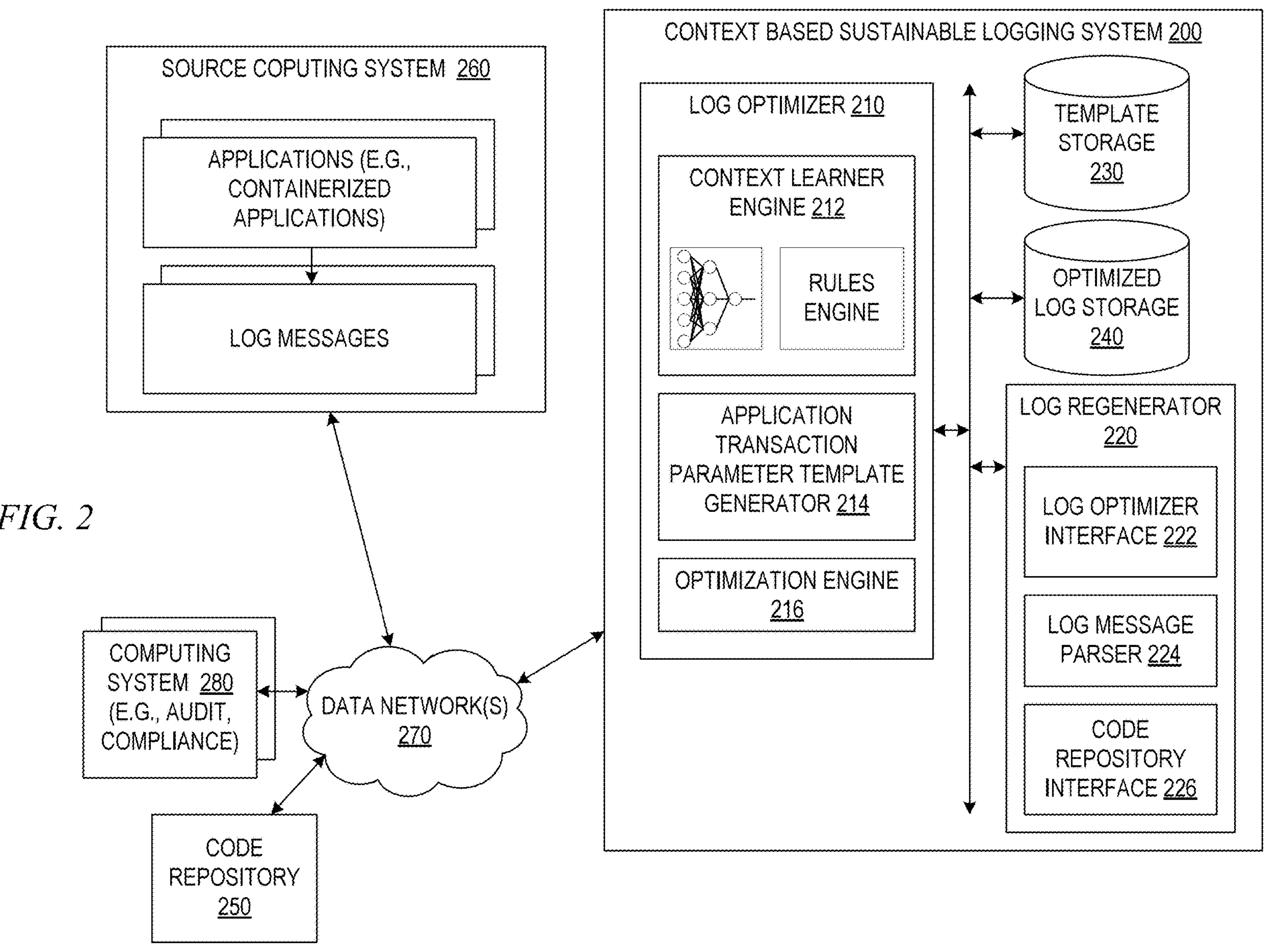
FIG. 2 is an example block diagram illustrating the primary operational components of a context based sustainable logging system in accordance with one illustrative embodiment.

FIG. 2 is an example block diagram illustrating the primary operational components of a context based sustainable logging system in accordance with one illustrative embodiment. The operational components shown in FIG. 2 may be implemented as dedicated computer hardware components, computer software executing on computer hardware which is then configured to perform the specific computer operations attributed to that component, or any combination of dedicated computer hardware and computer software configured computer hardware. It should be appreciated that these operational components perform the attributed operations automatically, without human intervention, even though inputs may be provided by human beings and the resulting output may aid human beings, such as in the case of application development, debugging, compliance auditing, or the like. The invention is specifically directed to an improved computing tool and improved computing tool operations/functionality having automatically operating computer components directed to improving the way that application transaction log messages are optimized to reduce storage and data transfer requirements, and which provides a specific solution that implements a log optimizer, log regenerator, and specific logic and operations to generate application parameter templates and regenerate application transaction logs that were reduced through optimization operations, which cannot be practically performed by human beings as a mental process and is not directed to organizing any human activity.

As shown in FIG. 2, the context based sustainable logging system 200 comprises, as primary components, a log optimizer 210 and a log regenerator 220. The log optimizer 210 in turn comprises a context learner engine 212, an application transaction parameter template generator 214, and an optimization engine 216. The log regenerator 220 in turn comprises a log optimizer interface 222, a log file parser 224, a code repository interface 226, and a log entry regenerator engine 228. These components 210-228 further operate in conjunction with a template storage 230, an optimized log storage 240, and a code repository 250 (which may or may not be part of the context based sustainable logging system 200 based on the desired implementation). The context based sustainable logging system 200 may operate as part of a remotely located computing system, e.g., cloud based computing system having one or more server computing devices and other computing infrastructure components, that provides a service to client computing systems, such as source computing system 260, via one or more data networks 270. In such a configuration, log messages may be transmitted to the system 200 for optimization in accordance with one or more illustrative embodiments. In other cases, elements of the system 200 may be implemented at the client computing systems, e.g., the log optimizer 210, such that the size of data transmissions is minimized. In either case, other computing systems, such as computing system 280, may utilize the logs in the optimized log storage 240 to perform other operations, such as auditing operations, compliance check operations, and the like, and may request these logs from the system 200. In such a case, it may be necessary to regenerate the original log messages from the optimized log storage 240 using the stored templates 230, as described hereafter, such that the original log messages may be sent to the system 280 for utilization.

The log optimizer 210, as described hereafter, performs operations to learn the context of application transactions and multiple related application transactions, and evaluate log messages generated by source computing systems to determine which log messages, or portions of log messages, are critical and non-critical to maintain. For those log messages, or portions of log messages, that are determined to be non-critical, the log optimizer 210 operates to reduce the log messages or portions of log messages using generated log message parameter templates. These parameter templates are generated such that should the reduced log messages, or portions of log messages, need to be recreated at a later time, the log parameter templates provide sufficient representations of the parameters of the reduced log messages/portions of log messages that allow regeneration of the original log message.

For example, the context learner engine 212 of the log optimizer 210 comprises the specialized computer logic and computer resources that operate to learn the context of log messages and correlations of these contexts with classifications of log messages or portions of log messages as to their criticality or non-criticality. Hereafter, it will be assumed for this description that the illustrative embodiments operate on "log messages", but this should be considered to be any portion of a log message, which may be less than or up to the entirety of the log message, and/or combinations of portions or entireties of multiple log messages.

The context of a log message has two primary aspects. A first aspect is an applications' transactions relationship to other application transactions in a same environment or environment external to the environment of the application's transaction, such as in the case of a hybrid cloud, for example. A second aspect is an application's transaction log style mapped with corresponding application code in an application code repository, where logs consist of two import dimensions, i.e., parameters and invariants (properties of an application or transaction that is always true). Template generation, as discussed herein, occurs from a machine learning operation based on the parameters and invariants in the completed code flow path of an application transaction.

That is, the context learner engine 212 of the log optimizer 210 learns patterns of features of log messages and their corresponding classification as to whether the log message is critical or non-critical. In one or more illustrative embodiments, the context learner engine 212 may be implemented, for example, as a rules based engine with a plurality of computer executable rules specifying log message characteristics as criteria and a classification or action to be executed as a triggered effect in response to the criteria being satisfied, for example. Identify the frequency of nominated business operation's transactions along with their completion status. These computer executable rules may be defined by subject matter experts based on empirical data or other knowledge and may be specific to the particular types of computing elements of source computing systems generating the log messages and the particular organizations with which these source computing systems are associated, e.g., different organizations may have different priorities as to criticality of different types of log information.

As one example, the computer executed rules may be executed on log messages to find log messages that are similar to one another and thus, repetitive instances may be optimized or reduced by the mechanisms of the illustrative embodiments, in such a case the computer executed rules may determine similar log messages based on similarities in parameters, similarities in content with differing parameters and variables, and the like. The computer executable rules may, for example, in some cases identify log messages that have a predetermined number of variables or parameters that are the same, and may maintain a count of these log messages, and pointers to these log messages, that have a predetermined number of variables or parameters that are the same. Once this count reaches or exceeds a predetermined threshold count value, then optimization or reduction of these log messages may be performed on these and/or any subsequent similar log messages.

In another example, the computer executed rules may look for log messages that have successful completion indicators. Log messages associated with successfully completed operations may not be of significance for maintaining the log messages as it is less likely that there is a fault associated with these operations and the systems associated with these log messages. Thus, a computer executable rule may look for indicators of successful completion in the log message parameters or variables and flag those log messages for optimization or reduction through the mechanisms of the illustrative embodiments.

In some illustrative embodiments, the computer executable rules may further evaluate temporal parameters or variables between particular types of log messages to determine the significance of the log messages. For example, if a particular temporal pattern is present for a particular set of log messages, e.g., log message 1 followed by log message 2 within X time period, this may be indicative of a set of log messages that may be suitable for optimization or reduction through the mechanisms of the illustrative embodiments. This pattern may be extended to any suitable number of, and sequence of, log messages and may be for any suitable temporal duration. In some illustrative embodiments, for example, log messages that are determined to be the same or substantially similar to one another occurring within a short duration may be determined to be non-critical and may be flagged for optimization and reduction by the mechanisms of the illustrative embodiments.

It should be appreciated that the computer executable rules for defining log messages that are critical and/or non-critical may take many different forms and may have many different types of criteria depending on the desired implementation and thus, not all possibilities can be represented in this description. The computer executable rules of the illustrative embodiments are intended to encompass any computer executable rules having any suitable criteria specifying characteristics of parameters or variables of log messages, sequences or patterns of log messages, and temporal conditions of log messages, without departing from the spirit and scope of the present invention.

In some example embodiments, similar log messages may be identified and used as a criterion for triggering the effects of the computer executable rules. In some illustrative embodiments, these similarities may be evaluated by identifying log messages have the same parameters or variables specified in the content of the log messages. In other illustrative embodiments, a fuzzy matching approach may be used to identify a level of matching of parameters or variables between the log messages and if a sufficient number of parameters or variables match, then the log messages may be considered sufficiently similar, e.g., a degree of matching based on the number of matching parameters or variables, e.g., if 80% of the log message parameters/variables match, then the log messages are considered to be the same or sufficiently similar. In other illustrative embodiments, a weighted approach may be utilized where certain variables and parameters in the content of log messages may be weighted more or less heavily with regard to determining a degree of matching between the log messages.

In still other illustrative embodiments, similarities of log messages may be determined based on a vector similarity analysis. That is, through representation of the log messages as vector representations using a vector embedding operation, e.g., Word2Vec or other vector embedding technique, the illustrative embodiments may then perform a vector similarity analysis of the resulting vector representations of two or more log messages to generate a similarity metric. The similarity of the log messages may then be determined by comparing the similarity metric to a threshold similarity metric which, if met or exceeded, indicates that the log messages are sufficiently similar as to be candidates for optimization or reduction through the mechanisms of the illustrative embodiments.

Any suitable existing or later developed technique for identifying sufficiently similar log messages may be used without departing from the spirit and scope of the present invention. Moreover, in some illustrative embodiments, various ones and combinations of the above techniques may be utilized, e.g., determining similarities between log messages based on vector similarity techniques and using computer executed rules to determine candidates for optimization/reduction based on this similarity of log messages and other criteria.

In other illustrative embodiments, the context learner engine 212 may be, or include, one or more neural networks or other machine learning computer models that is/are trained on training data comprising log messages and their corresponding ground truth classifications, e.g., correct classifications as to whether they are critical or non-critical, to thereby learn patterns of characteristics of log messages as input features to the machine learning computer model, and corresponding classifications as to whether those log messages are critical or non-critical. The machine learning computer model may be trained using a machine learning training algorithm, e.g., a regression based machine learning algorithm, to adjust the operational parameters of the machine learning computer model so as to achieve a desired classification performance.

The machine learning training operation involves processing input features through the machine learning computer model to generate a prediction or classification, comparing the prediction/classification to the ground truth for the input to determine an error or loss, executing a machine learning training algorithm to adjust operational parameters of the machine learning computer model to reduce the error or loss, and performing multiple iterations of this process until a convergence criterion is reached, e.g., an error or loss equal to or less than a predetermined threshold error or loss, or a predetermined number of iterations, or epochs, have occurred. Once the convergence criterion is reached, the machine learning computer model is considered to be a trained machine learning computer model and may be tested using a testing dataset to confirm satisfactory performance of the machine learning computer model, and deployment of the machine learning computer model for use in processing new workloads.

In accordance with one or more of the illustrative embodiments, the machine learning computer model receives inputs representing features of the log message and its context, evaluates the particular pattern(s) in these input features, and generates a classification output indicating the criticality of the corresponding log message (or portions of log messages). This classification output may be a binary output indicating that the log message is critical or not critical. Alternatively, the classification output may be a metric indicating a criticality of the log message on a spectrum of criticality, e.g., a probability of criticality from 0.0 to 1.0 or the like. The context may include other log message parameters/variables that have been generated within a predetermined time period of the present log message, temporal information associated with the log message, and other parameters/variables regarding the source computing system and other factors existing outside of the log message content itself.

As one example of learning the context of log messages that are indicative of a classification of the log message being critical or non-critical, consider again the example of Persistent Volume Delete operations. For example, the Persistent Volume Delete operation may be as follows:

[root@xyz] #oc logs xyz-spectrum-scale-csi-tp8sg|grep "/csi.v1.Controller/DeleteVolume" |wc-1 227540

Again, as stated above, Persistent Volume Delete operations on large running Kubernetes clusters may generate 220,000 or more logging operations (per day) and these logging operations are performed with every successful or failed delete operation/transaction. Moreover, each of these log operations may generate approximately 20 or more lines of log information in the log files. This means that just for these delete operations, the logging system will have to generate 4,400,000 or more lines of log information in the log files and potentially transmit this information for storage and/or subsequent processing. If these delete operations are performed successfully, the lines in the log files are still generated, however, it is very rare that an application developer or site reliability engineer (SRE) would be interested in looking at them. However, it is possible that these log entries may be needed at a later time for auditing and compliance purposes. Thus, these types of log entries may be optimized and reduced in the log messages that are stored and transmitted, but will need to be able to be reproduced should the need arise, e.g., for auditing and compliance purposes. The illustrative embodiments provide parameter templates that may be used to perform this regeneration of the log entries at a later time.

In contrast to the above PersistentVolume Delete operation, there are other operations, such as health check operations, where these operations may happen at a relatively low frequency, e.g., 150 health check related application operations/transactions in the day (approximately every 10 mins) and they are occurring at a certain interval. While these are also repeated transactions, an application developer would be interested to review them in detail to check the overall state of the application during the day. Therefore, these types of operations/transactions are not candidates for optimization by reduction of their log entries in the log file. Thus, these types of operation/transaction log messages may be specified in computer executable rules, and computing models may be trained to recognize the characteristics of such messages to classify them as not candidates for optimization/reduction.

In addition to identifying the types of operation/transaction log messages that may be optimized/reduced based on characteristics of the log messages and the context associated with these log messages, other temporal characteristics may be considered to identify out of the ordinary situations where the log messages may not be candidates for optimization/reduction. For example, consider a situation in which one delete operation/transaction is expected to be completed within 40 seconds. If the delete operation instead takes 200 seconds to complete, even if completed successfully, this may be indicative of a suspicious or potentially faulty operation of the source computing system. In such cases, the operations/transactions occurring within a time window before and after the present operation/transaction for the log message being evaluated may be of importance to determining whether the log message is a candidate for optimization/reduction. In such a case, the log messages for the current operation/transaction as well as these other operations/transactions, i.e., contextual operations/transactions, should not be considered candidates for optimization/reduction. Such logic may be represented in the patterns identified in the trained machine learning computer model(s) and/or in the logic of the criteria set forth in the computer executable rules of the various illustrative embodiments of the present invention.

The logic of the computer executable rules and the learning of patterns by the trained machine learning computer models may take into consideration multiple operations/transactions and their relationships, i.e., the patterns of these multiple operations/transactions as represented by their log messages. For example, consider one Persistent Volume lifecycle where create/update and delete on the same volume would be considered related operations/transaction. If the log message for the create operation/transaction is considered a candidate for log optimization/reduction, but the log message associated with a delete volume operation/transaction indicates that this delete operation/transaction took an amount of time larger than an expected amount of time for this operation/transaction, then the flagging of the log message of the create operation/transaction may be reset such that it is no longer considered a candidate for log optimization/reduction by the mechanisms of the illustrative embodiments.

As noted above, the context learner engine 212 of the log optimizer 210, as part of its learning, may learn the frequency of operations/transactions that are flagged for potential log optimization/reduction within a defined timeframe as a characteristic for determining whether to optimize/reduce the log messages using the parameter template mechanisms. If an operation/transaction has a high frequency of occurrence than expected within a given timeframe or window of time, then the operation/transaction is considered a candidate for log optimization/reduction. If an operation/transaction has a low frequency of occurrence than expected within a given timeframe or window of time, then the operation/transaction is not considered a candidate for log optimization/reduction.

Thus, in some illustrative embodiments, the log optimizer 210 of the context based sustainable logging system 200 is provided which analyzes application log messages associated with application operations/transactions to determine the frequency and completion status of application operations/transactions, as represented by their log messages and the characteristics, e.g., parameters and variables, and context of the log messages. The frequency may be determined based on similarity analyses between log messages. The log optimizer 210 may also determine particular types and patterns of log messages that are candidates for optimization, such as by reducing the log files by removing the log messages and replacing them with parameter templates that can be used for multiple log messages. In some illustrative embodiments, in the case of frequency and completion status, the log optimizer 210 may determine if the same type of application operation/transaction is occurring and completing successfully in large numbers within a pre-defined timeframe, in which case such log messages may be identified as candidates for log optimization/reduction, whereas logs associated with failed operations/transactions may not be considered as candidates since their failures will likely need to be evaluated further from the log files.

For those operations/transactions having log messages that are flagged as candidates for optimization/reduction, the application transaction parameter template generator 214 operates to generate application transaction parameter templates, or simply "parameter templates", that store the parameters of the log messages for the operations/transactions. This is beneficial for cases where the same or substantially similar operations/transactions occur frequently, have content and temporal contexts indicating that they are not critical log messages to maintain, and which are not part of other larger operations/transactions whose log messages should be maintained, e.g., an "outer" transaction that is critical for logging.

The template generation by the application transaction parameter template generator 214 identifies the parameters/variables for operation/transaction and their corresponding values. These parameters/variables and their corresponding values may be stored in a template data structure. The template data structure may, in some illustrative embodiments, include a parameter/variable descriptor file that specifies the parameters/variables, and a descriptor value file that specifies the particular values for an instance of the operation/transaction. Thus, the same parameter/variable descriptor file may apply to multiple instances of the same or similar operation/transaction, with different descriptor value files being provided for each instance of the operation/transaction. Thus, rather than having to store each set of log messages each time the same operation/transaction occurs, the mechanisms of the illustrative embodiments during a first instance of an operation/transaction is able to generate the parameter/variable descriptor file and a descriptor value file for that instances, and thereafter need only generate the descriptor value file for subsequent instances of the same or similar operation/transaction represented in the sets of log messages provided for logging and log optimization.

For example, consider the example log content of FIG. 3. As shown in FIG. 3, the log entry 310 comprises one or more log messages specifying one or more operations and transactions, as well as parameters/variables associated with these operations and transactions. From these log messages, the various contexts, e.g., volume contexts 320, may be extracted that describe the various parameters/variables, or "keys", and their corresponding values. These volume contexts may be stored as the parameter/volume descriptor file specifying the keys and the parameter value file storing the values for the particular instance. Thereafter, subsequent log messages having the same or similar contexts may be identified by the optimization engine 216 for optimization/reduction. In such a case, the subsequent instances may have their contexts reduced and a corresponding parameter value file stored with linkage to the parameter/variable descriptor file.

For example, the extracted contexts 320 in FIG. 3 may optimized/reduced such that the log 310 may be logged as simply:

volume_context: <key: "<DESC1_1>"> volume_context: <key: "storage.kubernetes.io/csiProvisionerIdentity"

value: "1673517467353-8081-spectrumscale.csi.ibm.com"> volume_context: <key: "volBackendFs" value: "remote-multiguitest-fs1"> completed successfully, time spent: 130 ns

As shown above, the log entry is significantly reduced and stores only the critical portions of the log entry needed for regeneration of the full log entry. If this operation/transaction is repeated, the repeat instances can be simply logged as:

volume_context: <key: "<DESC1_2>"> where the key value "<DESC1_2>" references a second instance of the same or similar operation and references the same parameter/variable descriptor file. If all of the values for the keys are the same, then no further parameter value files would be necessary and merely the pointer to the parameter/variable descriptor file may be used with the first parameter value file being used in the case of a need to regenerate the log message. However, assuming that there may be some variations in values for some keys, a second parameter value file may be generated for the next instances, and so on, for the parameter/variable descriptor file "DESC1" and stored as the "DESC1_2" parameter/variable descriptor file, for example. This may be repeated for each subsequent instance. Thus, the reduction in log messages and log entries in log files is significant when one considers the examples of operations/transactions being repeated numerous times in a given time window, e.g., 220,000+ times per day with each log entry having 20+ lines of log data, i.e., log messages.

As mentioned above, the template may comprise a parameter/variable descriptor file that stores the context keys specified in the log messages of an operation/transaction. The template may also comprise one or more parameter value files that map to the parameter/variables specified in the parameter/variable descriptor file. For example, a parameter/variable descriptor file may comprise the keys which are descriptors that map to objects defined in the container code of the application whose operations/transactions are being logged. The container code to which these keys are mapped may be stored in the code repository 250.

Figure 4:
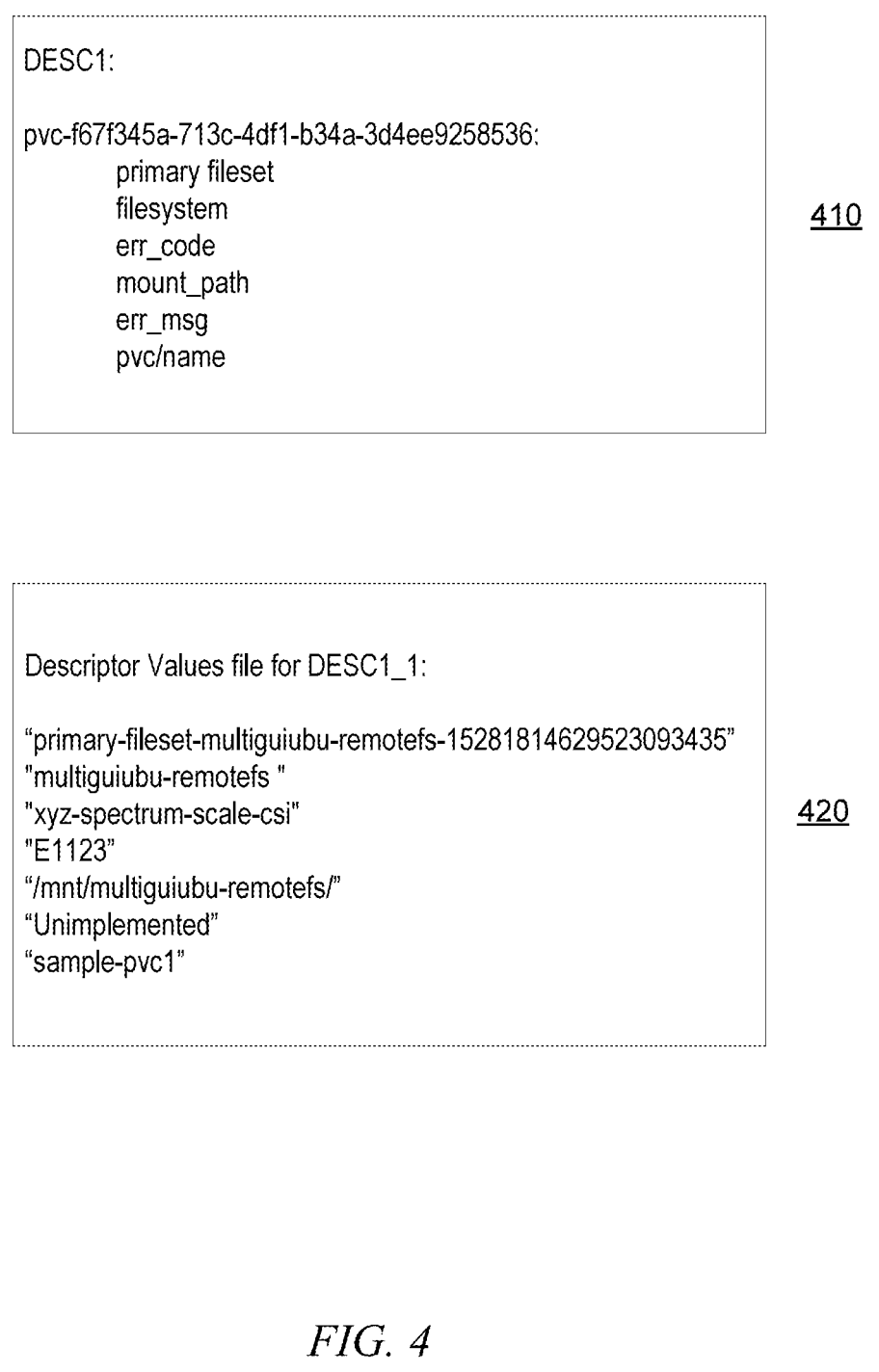

Thus, using the example log 310 and volume contexts 320 shown in FIG. 3, an example parameter/variable descriptor file may be of the type shown in FIG. 4. FIG. 4 is an example diagram of a template for storing parameter values for log messages that have been optimized/reduced in accordance with one illustrative embodiment. As shown in FIG. 4, the template comprises a parameter/variable descriptor file 410 and one or more parameter value files 420. The parameter/variable descriptor file 410 comprises the various volume context keys shown in FIG. 3 for the example log entry. These may be obtained by parsing the log messages of the log entry and extracting the key values from those log messages. For example, in the depicted example parameter/variable descriptor file 410, various key values including csi.storage.k8s.io, ephemeral, pod.name, pod.namespace, pod.uid, pv/name, pvc/name, pvc/namespace, and serviceAccount.name are stored in the file 410.

For instances of this same or similar operation/transaction, a parameter value file 420 may be generated that stores the values for the parameters/variables specified in the above descriptor file. For example, as shown in FIG. 4, a parameter value file 420 for the example of FIG. 3 may store values, for the corresponding keys in the descriptor file 410, of "false", "csi-scale-fsetdemo-pod1", "ibm-spectrum-scale-csi", "7f9161a3-43f7-4592-983a-2207b84a27ae", "pvc-6ef6ff36-f80f-42f8-b567-8cf701dcfcca", "scale-fset-pvc1", "ibm-spectrum-scale-csi", and "default".

The generated templates, comprising the parameter/variable descriptor file 410, may be stored in the template storage 230 and linked to the optimized/reduced log files via unique pointers to these templates in the template storage 230. The optimized/reduced logs may in turn be stored in the optimized log storage 240 and may comprise the descriptor value files 420 for the instances of the operation/transaction in the log files, and which are linked to the corresponding parameter/variable descriptor file 410. The combination of the files 410 and 420 may be regarded as the template used to regenerate the log messages at a later time should the need arise.

It should be appreciated that the actual evaluation of the log messages generated by a source computing system may be evaluated by the optimization engine 216 based on the computer executable rules and/or trained machine learning computer model(s) generated by the context learner engine 212. That is, during a runtime operation, the optimization engine 216 may receive a set of log messages that are to be evaluated for optimization/reduction, the optimization engine 216 may parse the set of log messages to identify the operations and corresponding transactions, e.g., transaction identifiers, referenced in the content of the log messages. Then, for each operation/transaction, the log messages corresponding to that operation/transaction may be parsed to extract the features, e.g., the keys and corresponding values, of that log message and the log messages corresponding to that transaction identifier, and other log messages which are within a predetermined temporal range before or after the log message being evaluated may be parsed and features extracted. The optimization engine 216 may then apply the computer executable rules and/or trained machine learning computer model(s) generated by the context learner engine 212 to generate a classification of the log message(s) as to whether it is a candidate for optimization/reduction. For example, this classification may be a classification of the log message as to whether it is critical or non-critical, with non-critical log messages being those that are candidates for optimization/reduction. Thus, where the context learner engine 212 learns the correlations between log message parameters/variables, their contexts, and a classification of the criticality of the log message, the optimization engine 216 applies the learned correlations to actual real-world log messages generated by source computing systems, such as after training of the machine learning computer model(s) by the context learner engine 212, and performs optimization/reduction operations to replace log messages, or portions thereof, with the templates generated by the template generator 214.

The templates themselves define the parameter/variables that are needed to regenerate the log messages in a manner where the specification of the parameter/variables may be used across multiple instances of the same or similar operation/transaction. The individual instance parameter values may be stored in separate files associated with the template for purposes of regenerating individual instances of log messages. These templates may be generated for each different type of application operation/transaction, pattern of application operations/transactions, or the like. The templates may be optimized by matching the application operation/transaction parameter with the corresponding code in the code repository 250. For example, based on the logging string in the corresponding code of the code repository 250, the log messages may be replaced by the templates in such a way that the generated template can be used to regenerate the log messages. That is, the log is scanned and a map of the operation with the associated transaction is stored. Transactions for an operation are found using the code corresponding to each operation. This mapping of transactions and operations may then be used to restore the log messages from the template.

Thus, the illustrative embodiments provide an improved computing tool and improved computing tool operations/functionality that is specifically directed to solving the issues in existing computer logging systems with regard to the sizes of log files and the amount of storage resources, transmission resources, and processing resources needed to handle these voluminous log files. The illustrative embodiments provide an intelligent logging system that optimizes the logs by intelligently classifying log messages as to their criticality to thereby select log messages for operations/transactions that can be optimized/reduced. The intelligent log optimizer 210 of the context based sustainable logging system 200 replaces the log messages with a minimalistic message and stores the information in a template that can be used to rebuild the original log message should the need arise. This optimization/reduction is based on various factors, some may be hardcoded configurations, some may be based on computer executable rules provided by subject matter experts, and some may be learned through machine learning processes to thereby generate one or more applicable trained machine learning models to classify log messages as to their criticality for being maintained, or put another way, for identifying log messages that may be candidates for optimization/reduction. Moreover, the log optimizer stores the necessary information for regeneration of the log messages in the template such that the log regenerator 220 can utilize this information, along with container code from the code repository 250, to regenerate the optimized/reduced log messages at a later time if and when the need arises.

Figure 5:
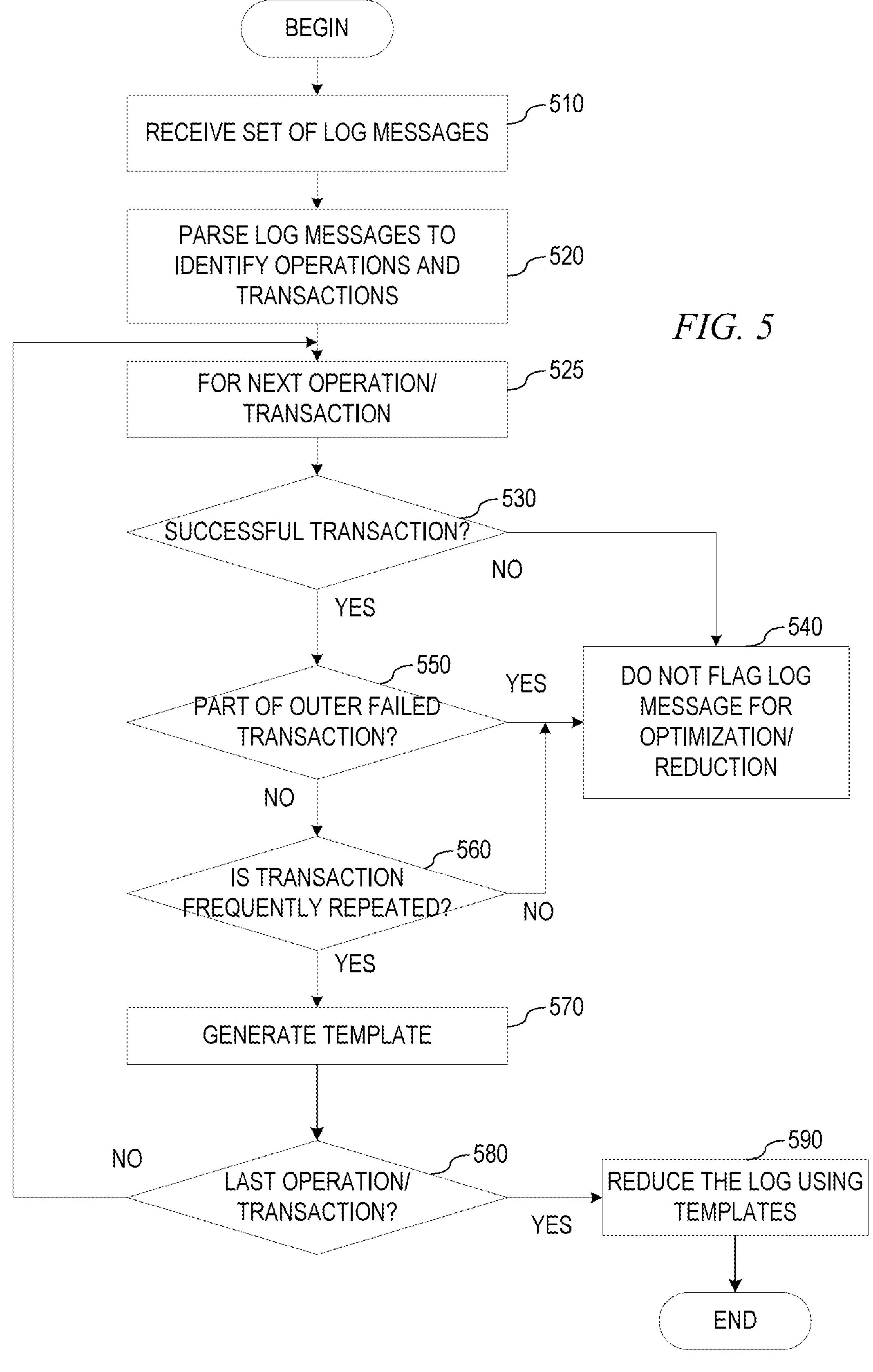
FIG. 5 is a flowchart outlining an example operation of a log optimizer in accordance with one illustrative embodiment.
Figure 6:
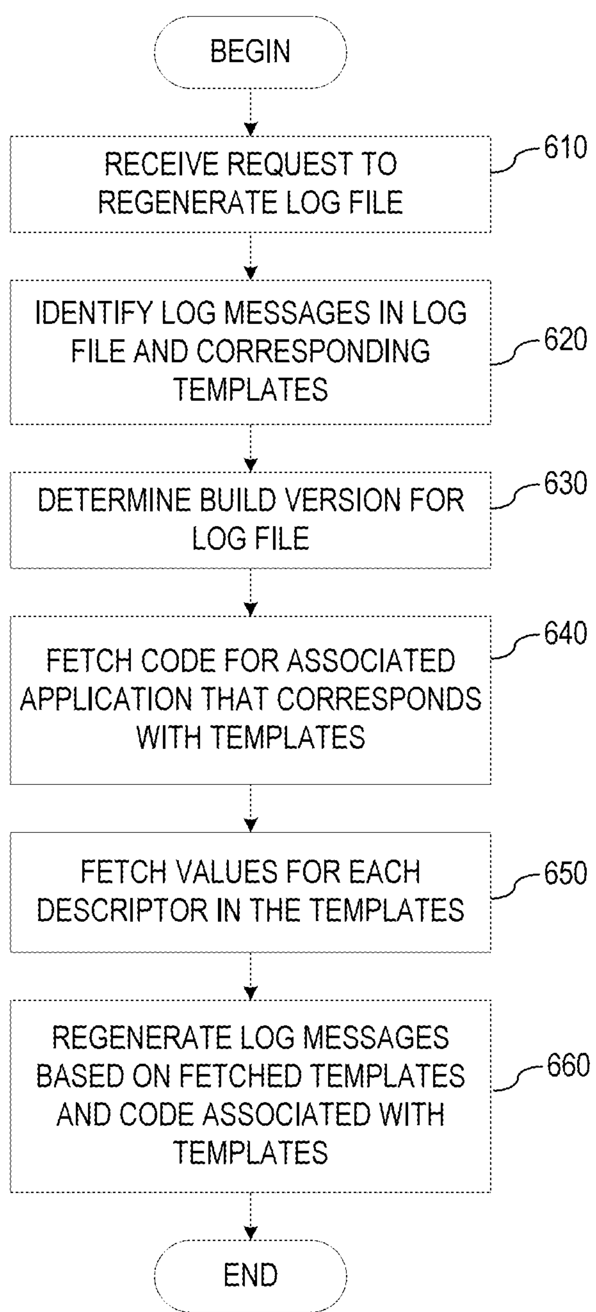
FIG. 6 is a flowchart outlining an example operation of a log regenerator in accordance with one illustrative embodiment.

FIGS. 5-6 present flowcharts outlining example operations of elements of the present invention with regard to one or more illustrative embodiments. It should be appreciated that the operations outlined in FIGS. 5-6 are specifically performed automatically by an improved computer tool of the illustrative embodiments and are not intended to be, and cannot practically be, performed by human beings either as mental processes or by organizing human activity. To the contrary, while human beings may, in some cases, initiate the performance of the operations set forth in FIGS. 5-6, and may, in some cases, make use of the results generated as a consequence of the operations set forth in FIGS. 5-6, the operations in FIGS. 5-6 themselves are specifically performed by the improved computing tool in an automated manner.

FIG. 5 is a flowchart outlining an example operation of a log optimizer in accordance with one illustrative embodiment. As shown in FIG. 5, the operation starts by receiving a set of log messages for logging in a log file (step 510). The log messages are parsed to identify each operation specified in the log messages and their corresponding transactions, i.e., transaction identifiers (step 520). As part of the operation of step 520, for each operation in the log messages, the code for that operation is fetched from a code repository and a list of transactions is obtained form the fetched code to thereby identify the transactions and their correspondence to the log messages.

For a next identified operation/transaction in the set of log messages (step 525), a determination is made, based on the content of the corresponding log messages, as to whether the transaction was completed successfully (step 530). If the log messages indicate that the transaction was not completed successfully (step 530: NO), then the log message is not flagged for optimization/reduction (step 540). If the log messages indicate that the transaction was completed successfully (step 530: YES), a determination is made as to whether this transaction is part of a larger set of transactions that failed to complete successfully (step 550). If the transaction is part of a larger set of transactions that failed (step 550: YES), then the operation goes to step 540 and the log message is again not flagged for optimization/reduction.

If the transaction is not part of a larger set of transactions that failed (step 550: NO), then a determination is made as to whether the transaction is frequently repeated (step 560). If the transaction is not frequently repeated (step 560: NO), then the operation goes to step 540 and the log message is again not flagged for optimization/reduction. If the transaction is frequently repeated (step 560: YES), then a template for the transaction parameters is generated (step 570). A determination is then made as to whether this is the last operation/transaction in the set of log messages (step 580). If not (step 580: NO), the operation returns to step 525 and the operation is repeated for the next operation/transaction in the set of log messages. If this is the last operation/transaction (step 580: YES), then the log messages are optimized/reduced based on the generated templates for the operations/transactions in the set of log messages which are flagged for optimization/reduction (step 590). The operation then terminates. While the flowchart indicates a termination of the operation, it should be appreciated that this operation may be repeated with each set of log messages received.

FIG. 6 is a flowchart outlining an example operation of a log regenerator in accordance with one illustrative embodiment. As shown in FIG. 6, the operation starts with a request to regenerate a log file (step 610). This request may be received in response to an operation that requires the complete log file for performance of additional analytics or other operations, such as for auditing or compliance checks. In response to the request to regenerate the log file, each log message in the log file that was optimized/reduced is identified (step 620) and the corresponding template(s) for those log messages is retrieved from a template storage associated with the log file. A build version for the log file is fetched (step 630), where this build version is the unique identifier of the application that generated the log file. The code for the associated application that corresponds to the templates, i.e., the code for the application that is the subject of the log file or which generated the log file, is fetched from a code repository (step 640). The values for each of the descriptors in the templates are fetched (step 650) and the log messages are then regenerated based on the fetched templates and the fetched code associated with the templates (step 650). The operation then terminates.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, in a data processing system, for optimizing application log messages, the computer-implemented method comprising:

receiving a first log message for inclusion in a log file;

parsing the first log message to extract features of the first log message;

parsing one or more second log messages, associated with the first log message, to extract context information for determining a context of the first log message;

classifying the first log message as to whether the first log message is a candidate for optimization, based on the extracted features of the first log message and the context of the first log message, wherein the classifying of the first log message comprises executing one or more computer executable rules that:

analyze the first log message and the one or more second log messages to:

determine a frequency of similar transactions in the one or more second log messages, wherein the similar transactions correspond to the first log message; and determine a completion status of the similar transactions;

determine, based on the frequency and the completion status, whether the first log message is associated with a type of transaction that is completing successfully with at least a predetermined frequency within a pre-defined timeframe;

classify the first log message as the candidate for the optimization in a case where the first log message is associated with the type of transaction that is completing successfully with at least the predetermined frequency within the pre-defined timeframe; and classify the first log message as not the candidate for the optimization in a case where the first log message is not associated with the type of transaction that is completing successfully with at least the predetermined frequency within the pre-defined timeframe;

generating, based on the first log message being classified as the candidate for the optimization, a template for the first log message, wherein the template stores parameters of the first log message for later regeneration of the first log message;

replacing the first log message with a reference to the template to generate a reduced size log entry; and storing the reduced size log entry in the log file.

2. The computer-implemented method of claim 1, wherein the first log message is a log message for provisioning or deprovisioning computing resources.

3. The computer-implemented method of claim 1, wherein the classifying of the first log message further comprises executing the one or more computer executable rules that:

determine whether a transaction corresponding to the first log message has parameter values that are within predetermined limits; and classifying, based on the transaction having the parameter values that are within the predetermined limits, the first log message as the candidate for the optimization.

4. The computer-implemented method of claim 1, wherein the classifying of the first log message further comprises executing the one or more computer executable rules that:

determine whether a transaction corresponding to the first log message is part of a temporal pattern of transactions having a predetermined temporal distance between transactions in the temporal pattern of transactions; and classifying, based on the transaction corresponding to the first log message being part of the temporal pattern of transactions, the first log message as not the candidate for the optimization.

5. The computer-implemented method of claim 1, wherein the classifying of the first log message further comprises classifying the first log message based on a machine learning computer model learning, through a machine learning process, patterns of features of log messages and correlations with criticality classifications, a first set of log messages, of the log messages, having a critical classification are not candidates for the optimization, and a second set of log messages, of the log messages, having a noncritical classification are candidates for the optimization.

6. The computer-implemented method of claim 1, wherein the parsing of the one or more second log messages, associated with the first log message, to extract the context information for determining the context of the first log message further comprises:

executing a similarity comparison of the first log message to a plurality of log messages; and determining, based on the similarity comparison, the one or more second log messages having at least a predetermined threshold level of similarity to the first log message.

7. The computer-implemented method of claim 1, wherein the classifying of the first log message further comprises at least one of:

determining whether the first log message is of a particular type of log message that is predefined as a log message that should not be optimized, or determining whether the first log message corresponds to a transaction that required longer than a predetermined amount of time to complete successfully.

8. The computer-implemented method of claim 1, further comprising:

receiving a request from a computing system, different from the data processing system, to access the log file to perform a computing operation;

regenerating, based on the receiving of the request, the first log message from the reference to the template in the log file to provide an expanded log file; and providing the expanded log file to the computing system.

9. The computer-implemented method of claim 1, wherein the template stores the context information as a parameter descriptor file and a descriptor value file.

10. A computer program product comprising a computer readable storage medium having a computer readable program stored therein, wherein the computer readable program, when executed on a computing device, causes the computing device to:

receive a first log message for inclusion in a log file;

parse the first log message to extract features of the first log message;

parse one or more second log messages, associated with the first log message, to extract context information for determining a context of the first log message;

classify the first log message as to whether the first log message is a candidate for optimization, based on the extracted features of the first log message and the context of the first log message, wherein the classification of the first log message comprises execution of one or more computer executable rules that:

analyze the first log message and the one or more second log messages to:

determine a frequency of similar transactions in the one or more second log messages, wherein the similar transactions correspond to the first log message; and determine a completion status of the similar transactions;

determine, based on the frequency and the completion status, whether the first log message is associated with a type of transaction that is completing successfully with at least a predetermined frequency within a pre-defined timeframe;

classify the first log message as the candidate for the optimization in a case where the first log message is associated with the type of transaction that is completing successfully with at least the predetermined frequency within the pre-defined timeframe; and classify the first log message as not the candidate for the optimization in a case where the first log message is not associated with the type of transaction that is completing successfully with at least the predetermined frequency within the pre-defined timeframe;

generate, based on the first log message being classified as the candidate for the optimization, a template for the first log message, wherein the template stores parameters of the first log message for later regeneration of the first log message;

replace the first log message with a reference to the template to generate a reduced size log entry; and store the reduced size log entry in the log file.

11. The computer program product of claim 10, wherein the first log message is a log message for provisioning or deprovisioning computing resources.

12. The computer program product of claim 10, wherein the computer readable program further causes the computing device to classify the first log message at least by executing the one or more computer executable rules that:

determine whether a transaction corresponding to the first log message has parameter values that are within predetermined limits; and classify, based on the transaction having the parameter values that are within the predetermined limits, the first log message as the candidate for the optimization.

13. The computer program product of claim 10, wherein the computer readable program further causes the computing device to classify the first log message at least by executing the one or more computer executable rules that:

determine whether a transaction corresponding to the first log message is part of a temporal pattern of transactions having a predetermined temporal distance between transactions in the temporal pattern of transactions; and classify, based on the transaction corresponding to the first log message being part of the temporal pattern of transactions, the first log message as not the candidate for the optimization.

14. The computer program product of claim 10, wherein the classification of the first log message is based on a machine learning computer model learning, through a machine learning process, patterns of features of log messages and correlations with criticality classifications, a first set of log messages, of the log messages, having a critical classification are not candidates for the optimization, and a second set of log messages, of the log messages, having a non-critical classification are candidates for the optimization.

15. The computer program product of claim 10, wherein the parsing of the one or more second log messages, associated with the first log message, to extract the context information for determining the context of the first log message further comprises:

execution of a similarity comparison of the first log message to a plurality of log messages; and determination of the one or more second log messages having at least a predetermined threshold level of similarity to the first log message.

16. The computer program product of claim 10, wherein the classification of the first log message further comprises at least one of:

determination of whether the first log message is of a particular type of log message that is predefined as a log message that should not be optimized, or determination of whether the first log message corresponds to a transaction that required longer than a predetermined amount of time to complete successfully.

17. The computer program product of claim 10, wherein the computer readable program further causes the computing device to:

receive a request from a computing system to access the log file to perform a computing operation;

regenerate, based on the received request, the first log message from the reference to the template in the log file to provide an expanded log file; and provide the expanded log file to the computing system.

18. An apparatus, comprising:

at least one processor; and at least one memory coupled to the at least one processor, wherein the at least one memory comprises instructions which, when executed by the at least one processor, cause the at least one processor to:

receive a first log message for inclusion in a log file;

parse the first log message to extract features of the first log message;

parse one or more other second log messages, associated with the first log message, to extract context information for determining a context of the first log message;

classify the first log message as to whether the first log message is a candidate for optimization, based on the extracted features of the first log message and the context of the first log message, wherein the classification of the first log message comprises executing one or more computer executable rules that:

analyze the first log message and the one or more second log messages to:

determine a frequency of similar transactions in the one or more second log messages, wherein the similar transactions correspond to the first log message; and determine a completion status of the similar transactions;

determine, based on the frequency and the completion status, whether the first log message is associated with a type of transaction that is completing successfully with at least a predetermined frequency within a pre-defined timeframe;

classify the first log message as the candidate for the optimization in a case where the first log message is associated with the type of transaction that is completing successfully with at least the predetermined frequency within the pre-defined timeframe; and classify the first log message as not the candidate for the optimization in a case where the first log message is not associated with the type of transaction that is completing successfully with at least the predetermined frequency within the pre-defined timeframe;

generate, based on to the first log message being classified as the candidate for the optimization, a template for the first log message, wherein the template stores parameters of the first log message for later regeneration of the first log message;

replace the first log message with a reference to the template to generate a reduced size log entry; and store the reduced size log entry in the log file.

* * * * *